(12) United States Patent
Si et al.

(10) Patent No.: US 12,340,203 B2
(45) Date of Patent: Jun. 24, 2025

(54) FIRMWARE UPGRADE METHOD OF NETWORK STORAGE AND NETWORK STORAGE

(71) Applicant: SAMSUNG ELECTRONICS CO., LTD., Suwon-si (KR)

(72) Inventors: Zhou Si, Suwon-si (KR); Fan Shen, Suwon-si (KR); Ning Li, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 18/101,830

(22) Filed: Jan. 26, 2023

(65) Prior Publication Data

US 2024/0160429 A1  May 16, 2024

(30) Foreign Application Priority Data

Nov. 11, 2022  (CN) .......................... 202211414767.X

(51) Int. Cl.
*G06F 9/44* (2018.01)
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ................................... G06F 8/65; G06F 8/71
See application file for complete search history.

(56) References Cited

U.S. PATENT DOCUMENTS

| | | | |
|---|---|---|---|
| 7,203,723 B2 | 4/2007 | Ogawa | |
| 10,146,527 B2 | 12/2018 | Olarig et al. | |
| 10,263,844 B1 * | 4/2019 | Wu | G06F 8/654 |
| 2012/0331181 A1 * | 12/2012 | Govande | G06F 8/65 |
| | | | 710/8 |
| 2016/0092189 A1 * | 3/2016 | Pollack | G06F 8/65 |
| | | | 717/175 |
| 2017/0046152 A1 * | 2/2017 | Shih | G06F 8/654 |
| 2019/0272249 A1 * | 9/2019 | Olarig | G06F 3/0611 |

FOREIGN PATENT DOCUMENTS

| | | |
|---|---|---|
| CN | 111857576 A | 10/2020 |
| CN | 113434182 A | 9/2021 |

* cited by examiner

*Primary Examiner* — Qamrun Nahar
(74) *Attorney, Agent, or Firm* — Sughrue Mion, PLLC

(57) ABSTRACT

A firmware upgrade method of a network storage includes inquiring, by the network storage, about a latest firmware version for the network storage from a firmware upgrade platform through a network, and based on the latest firmware version being inconsistent with a current firmware version of the network storage, downloading, by the network storage, the latest firmware version from the firmware upgrade platform through the network and performing a firmware upgrade based on the latest firmware version.

18 Claims, 7 Drawing Sheets

FIG. 4

| Request line | | | | | |
|---|---|---|---|---|---|
| Request method | blank | Request URL | blank | HTTP version | Carriage return | Line Feed |

Request Headers:
| Key | : | Value | Carriage return | Line Feed |
| Key | : | Value | Carriage return | Line Feed |

Blank line: Carriage return | Line Feed

Request body

FIRMWARE UPGRADE METHOD OF NETWORK STORAGE AND NETWORK STORAGE

CROSS-REFERENCE TO RELATED APPLICATION

This application is based on and claims priority to Chinese Patent Application No. 202211414767.X, filed on Nov. 11, 2022 in the Chinese Patent Office, the contents of which being herein incorporated by reference in its entirety.

BACKGROUND

The present disclosure relates to memories and network storage devices, and more particularly, to a firmware upgrade method of a network storage and a network storage.

Operations of a memory (e.g. a network storage or a network attached storage), e.g., write data or read data, may be controlled by running a memory firmware (Firmware) stored therein. In order to optimize the operations of the memory, the firmware may be continuously upgraded. Firmware upgrade is a common equipment maintenance operation.

However, with the increasing number of large data centers and the increase in the amount of stored data, checking a firmware version and an acquisition of the firmware are carried out manually. Only one storage device can be upgraded at a time, which is inefficient and cannot meet current needs.

SUMMARY

It is an aspect to provide a firmware upgrade method of a network storage and a network storage, which is capable of realizing an automatic upgrade of firmware of a plurality of network storages, saving firmware upgrade time, and improving firmware upgrade efficiency.

According to an aspect of the present disclosure, there is provided a firmware upgrade method comprising inquiring, by a network storage, about a latest firmware version for the network storage from a firmware upgrade platform through a network; and based on the latest firmware version being inconsistent with a current firmware version of the network storage, downloading, by the network storage, the latest firmware version from the firmware upgrade platform through the network and performing a firmware upgrade based on the latest firmware version.

According to another aspect of the present disclosure, there is provided a network storage comprising a memory configured to store memory firmware; a network interface configured to access a network; and a processor configured to inquire about a latest firmware version for the network storage from a firmware upgrade platform through the network via the network interface, and based on the latest firmware version being inconsistent with a current firmware version of the network storage, download the latest firmware version from the firmware upgrade platform through the network via the network interface, and perform a firmware upgrade based on the latest firmware version.

According to yet another aspect of the present disclosure, there is provided a firmware upgrade method comprising automatically checking, by a network storage, a latest firmware version for the network storage from a firmware upgrade platform through a network; comparing, by the network storage, the latest firmware version with a current firmware version of the network storage; and based on the latest firmware version not being the same as the current firmware version, automatically downloading, by the network storage, the latest firmware version from the firmware upgrade platform through the network and updating the current firmware version based on the latest firmware version.

BRIEF DESCRIPTION OF THE DRAWINGS

The above and other aspects will be more apparent from the following description, taken in conjunction with the accompanying drawings, in which:

FIG. 4 is a diagram illustrating an example of an HTTP request, according to some embodiments;

DETAILED DESCRIPTION

Figure 1:
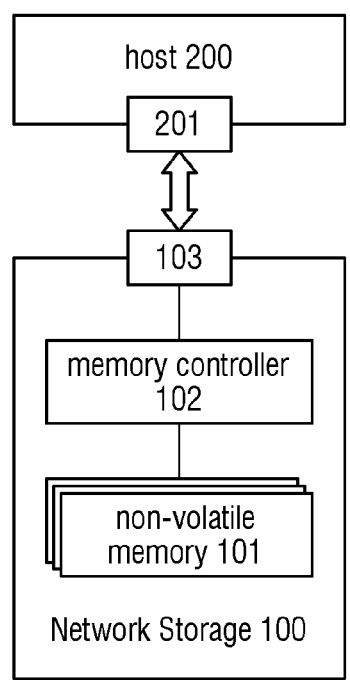
FIG. 1 is a diagram illustrating an architecture of a host and a network storage, according to some embodiments.

Hereinafter, various embodiments of the present disclosure are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "comprise," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the present disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate what the device and another device or part are "capable of." For example, the expression "a processor configured to perform A, B, and C" may indicate a dedicated processor (for example, an embedded processor) for performing a corresponding operation or a processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

According to an aspect of the present disclosure, a firmware upgrade method of a network storage may be provided which includes inquiring the latest firmware version of the network storage from a firmware upgrade platform through a wired/wireless network; and in response to the latest firmware version being inconsistent with a current firmware version of the network storage, downloading the latest firmware version from the firmware upgrade platform through the wired/wireless network and performing a firmware upgrade.

In some embodiments, the firmware upgrade method may further include, before downloading the latest version of firmware from the firmware upgrade platform, setting the network storage to a firmware upgrade state.

In some embodiments, the firmware upgrade method may further include, after completing the firmware upgrade, setting the network storage to a non-firmware upgrade state.

In some embodiments, the firmware upgrade method may further include determining whether the network storage is in the firmware upgrade state; in response to the network storage being in the non-firmware upgrade state, performing the inquiring of the latest firmware version from the firmware upgrade platform through the wired/wireless network.

In some embodiments, the network storage may be an Ethernet solid state drive.

According to another aspect of the present disclosure, a network storage may be provided which includes a memory configured to store memory firmware; a network interface configured to access a wired/wireless network; and a processor configured to inquire the latest firmware version of the network storage from a firmware upgrade platform through the wired/wireless network via the network interface; in response to the latest firmware version being inconsistent with a current firmware version of the network storage, download the latest firmware version from the firmware upgrade platform through the wired/wireless network via the network interface, and perform a firmware upgrade.

In some embodiments, the processor may be further configured to, before downloading the latest version of firmware from the firmware upgrade platform, set the network storage to a firmware upgrade state.

In some embodiments, the processor may be further configured to, after completing the firmware upgrade, set the network storage to a non-firmware upgrade state.

In some embodiments, the processor may be further configured to determine whether the network storage is in the firmware upgrade state; in response to the network storage being in the non-firmware upgrade state, performing the inquiring of the latest firmware version of the network storage from the firmware upgrade platform through the wired/wireless network.

In some embodiments, the network storage may be an Ethernet solid state drive.

According to another aspect of the present disclosure, an electronic system may be provided, the electronic system including a main processor; a memory; and a storage device, wherein the storage device is a network storage and is configured to perform the firmware upgrade method as described above.

According to another aspect of the present disclosure, a data center may be provided, the data center including an application server; and a storage server configured to communicate with the application server through a network; wherein the storage server includes a network storage and is configured to perform the firmware upgrade method as described above.

The firmware upgrade method of the network storage and the network storage according to some embodiments can periodically check a firmware version and automatically download the latest version of firmware, which solves a problem that the network storage cannot obtain the latest version of firmware soon after an updated firmware is made available. In addition, the firmware upgrade method of the network storage and the network storage according to some embodiments can realize automatic upgrade of the firmware of the network storage, avoid a problem of low upgrade efficiency caused by manually upgrading a plurality of network storages one by one, save firmware upgrade time, and reduce a problem of lack of security and a problem of decreased operational efficiency caused by not upgrading the firmware promptly as new versions of the firmware are made available.

A difference between a network storage and a traditional (i.e., non-network) storage is that the network storage has a network interface, which can access a wired/wireless network, so as to have a network communication capability. Each network storage has an independent IP address, and a host connected to the network storage can identify the network storage through the IP address, thereby identifying the network storage.

FIG. 1 is a diagram illustrating an architecture of a host and a network storage, according to some embodiments.

As illustrated in FIG. 1, the architecture may include a network storage 100 and a host 200. In some embodiments, the network storage 100 may be an Ethernet solid state drive (SSD). However, this is only an example, and in some embodiments, the network storage 100 may be implemented in other forms. Referring to FIG. 1, the network storage 100 includes at least one non-volatile memory 101, a memory controller 102, and a network interface 103. For example, the at least one non-volatile memory 101 may be, for example, a flash memory. For example, the network interface 103 may be, for example, a network interface card (MC) interface. The host 200 may include a network interface 201 to connect with the network storage 100 through a wired/wireless network. The wired/wireless network may be, for example, an Ethernet. For example, the network interface 201 may be, for example, an NIC interface. After the network storage 100 is connected to the host 200, the host 200 cannot immediately identify the network storage 100. Therefore, the host 200 may complete identification through an NVMe command.

Figure 2:
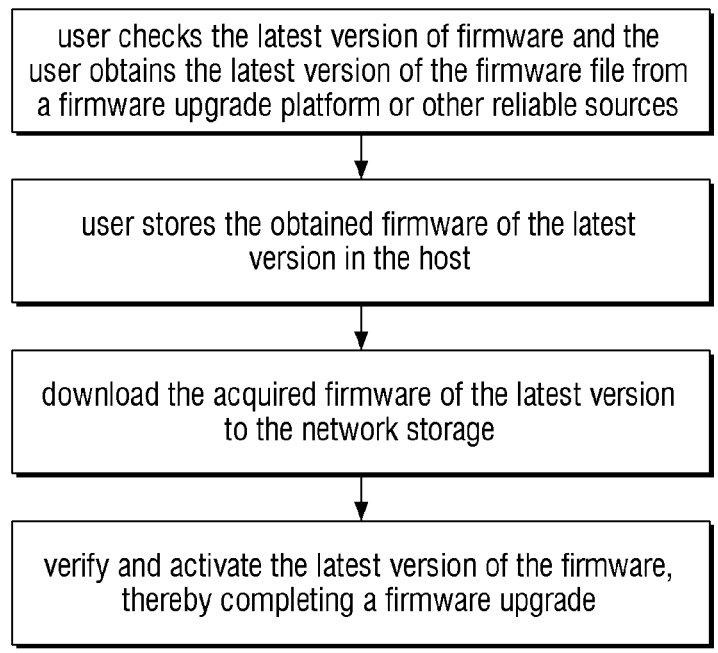
FIG. 2 is a flowchart illustrating a firmware upgrade method of a network storage according to the related art.

FIG. 2 is a flowchart illustrating a firmware upgrade method of a network storage, according to the related art.

The firmware upgrade method of the network storage is similar to a firmware upgrade method of a general storage device. Referring to FIG. 2, a user of a host can operate the host to check the latest version of firmware from a firmware upgrade platform (e.g. a firmware release website) or other reliable sources, and obtain the latest version of the firmware file from the firmware upgrade platform. Then, the user of the host may store, in the host, the obtained firmware of the latest version. Next, the host can download the acquired firmware of the latest version to the network storage. For example, the host can execute a nvme fw-download command to download the acquired firmware to the network storage. Finally, the network storage can verify and activate the latest version of the firmware, thereby completing the firmware upgrade. For example, the network storage can execute a nvme fw-activate command to verify and activate the latest version of the firmware and complete the firmware upgrade.

However, as described above, the firmware upgrade method of the network storage according to the related art has at least two disadvantages. First, checking the firmware version and obtaining the firmware file needs to be performed manually, which is inefficient. Second, since the firmware of only one network storage can be upgraded at a time (in other words, the user must manually check the firmware version and obtain and store the firmware file separately for each network storage), for a data center using a plurality of network storages, the firmware upgrade requires a huge amount of time and labor.

To this end, the present disclosure provides a firmware upgrade method of a network storage capable of realizing automatic upgrade and a network storage for executing the firmware upgrade method according to the network storage having a network communication capability. Hereinafter, the firmware upgrade method of the network storage and the network storage according to some embodiments will be described in detail with reference to the accompanying drawings.

Figure 3:
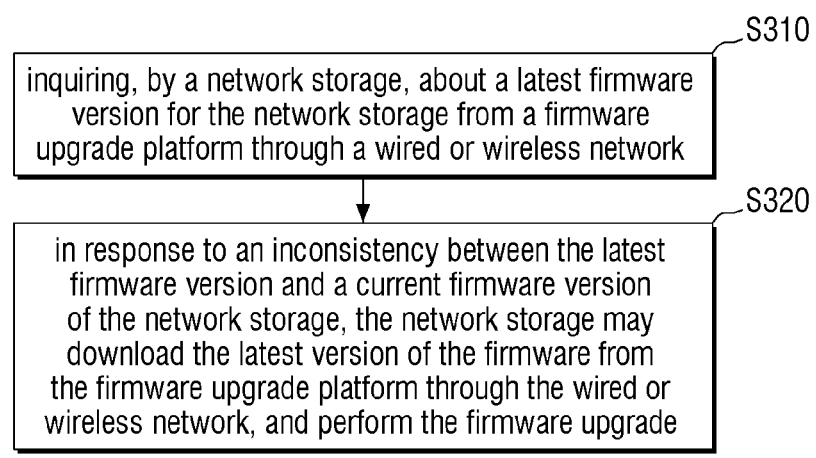
FIG. 3 is a flowchart illustrating a firmware upgrade method of a network storage, according to some embodiments.

FIG. 3 is a flowchart illustrating a firmware upgrade method of a network storage, according to some embodiments. The firmware upgrade method may be periodically performed by the network storage. The network storage may be, for example, an Ethernet SSD, but embodiments are not limited thereto.

Referring to FIG. 3, in step S310, the network storage 100 may inquire about the latest firmware version for the network storage from a firmware upgrade platform through a wired or wireless network. In some embodiments, the network storage 100 may automatically inquire about the latest firmware version for the network storage 100 from the firmware update platform. In some embodiments, the network storage 100 may automatically inquire periodically about the latest firmware version for the network storage 100. For example, in a configuration in which the network storage 100 is an Ethernet SSD, the Ethernet SSD has a network communication capability, and each Ethernet SSD has an independent IP address. As such, the network storage 100 can inquire about the firmware upgrade platform for the latest firmware version for the network storage 100 via the network interface 103 over the wired or wireless network. For example, as discussed above, the network interface may be, for example, an NIC interface, and the wired or wireless network may be, for example, a wired Ethernet or a wireless Ethernet.

Furthermore, in some embodiments, the network storage 100 can request the latest firmware version for the network storage 100 from the firmware upgrade platform through an HTTP request using a TCP/IP communication protocol.

FIG. 4 is a diagram illustrating an example of an HTTP request, according to some embodiments. Referring to FIG. 4, the HTTP request may include a request line, one or more request headers, and a request body. The request line may include a request method field, a request URL field and an HTTP protocol version field (HTTP version). In some embodiments, the request line may also include various blank portions. In some embodiments, the request line may consist of the request method field, the request URL field and the HTTP protocol version field. The request header may include a key/value (Key/Value) pair, which is used to notify the firmware upgrade platform of information about the request of the network storage 100. In some embodiments, the request header may consist of a key/value pair. The request body contains a data main part. The network storage 100 can assemble a request message according to the TCP/IP communication protocol, so as to perform a TCP/IP communication with the firmware upgrade platform. In some embodiments, the network storage 100 may close a connection to the firmware upgrade platform after the request message is sent.

According to some embodiments, before inquiring about the latest firmware version from the firmware upgrade platform through the wired or wireless network, it may be determined whether the network storage is in a firmware upgrade state, and in response to the network storage being in a non-firmware upgrade state, step S310 may be performed. For example, in some embodiments, the network storage 100 may determine whether the network storage 100 is in the firmware upgrade state and in response to the network storage 100 determining that the network storage 100 is not in the firmware upgrade state, step S210 may be performed. Here, the firmware upgrade state is used to indicate that the network storage 100 is in a state in which the firmware of the network storage 100 is currently being upgraded, and in the firmware upgrade state, the network storage 100 can suspend other operations (e.g. read and write operations, erase operations, etc.). For example, when the network storage 100 is initialized, the network storage 100 can be in the non-firmware upgrade state. As such, when the network storage 100 is in the non-firmware upgrade state, step S310 can be performed; and when the network storage 100 is in the firmware upgrade state, step S310 cannot be performed, but at a beginning of a next cycle, it may be re-determined whether the network storage 100 is in the firmware upgrade state.

Returning to FIG. 3, in step S320, in response to an inconsistency between the latest firmware version and a current firmware version of the network storage 100, the latest version of firmware may be downloaded from the firmware upgrade platform through the wired or wireless network, and a firmware upgrade is performed. For example, in some embodiments, the inconsistency may be that the latest firmware version is newer or more recent than the current firmware version. In some embodiments, in response to the inconsistency between the latest firmware version and a current firmware version of the network storage 100, the network storage 100 may download the latest version of firmware from the firmware upgrade platform through the wired or wireless network, and the network storage 100 may perform the firmware upgrade using the downloaded latest firmware version. In some embodiments, the network storage 100 may automatically download the latest version of firmware from the firmware upgrade platform through the wired or wireless network, and the network storage 100 may automatically perform the firmware upgrade using the downloaded latest firmware version. For example, in some embodiments, the network storage 100 may compare the latest firmware version for the network storage that was inquired in step S310 with a current firmware version of the network storage 100 to determine whether the inconsistency exists. In some embodiments, in response to the latest firmware version being inconsistent with the current firmware version of the network storage, the network storage 100 may be set to the firmware upgrade state before downloading the latest version of firmware from the firmware upgrade platform. In some embodiments, if the latest firmware version is consistent with the current firmware version of the network storage 100, step S310 can be re-performed at the beginning of the next cycle.

After completing the downloading of the latest version of the firmware, the downloaded firmware can be activated to complete the firmware upgrade. In some embodiments, after completing the downloading of the latest version of the firmware, the network storage 100 may automatically activate the downloaded firmware to complete the firmware upgrade. In some embodiments, the activation may be performed before or after firmware is updated on the network storage 100. In some embodiments, after the firmware upgrade is completed, the network storage 100 may be set to the non-firmware upgrade state, i.e. making the firmware upgrade state to be not set. After that, at the beginning of the next cycle, the firmware upgrade method described above can be restarted.

In the firmware upgrade method of the network storage according to some embodiments, the network storage 100 can periodically check the firmware version and automatically download the latest version of firmware, thereby realizing automatic upgrade of the firmware of the network storage, saving firmware upgrade time, and improving firmware upgrade efficiency.

Figure 5:
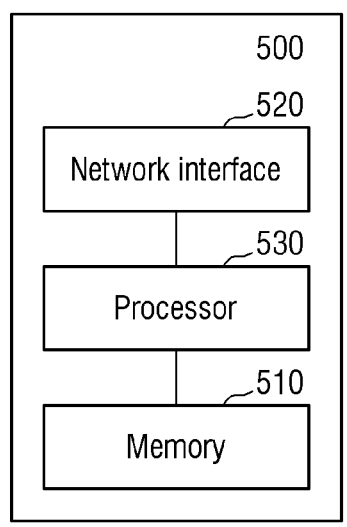
FIG. 5 is a block diagram illustrating a network storage, according to some embodiments.

FIG. 5 is a block diagram illustrating a network storage, according to some embodiments.

Referring to FIG. 5, a network storage 500 includes a memory 510, a network interface 520 and a processor 530. The network storage 500 may be an example of the network storage 100 described above. According to some embodiments, the network storage 500 may be, for example, an Ethernet SSD. In some embodiments, the memory 510 may store memory firmware. In some embodiments, the network interface 520 may access a wired and/or a wireless network. For example, in some embodiments, the network interface 520 may be a network interface card (NIC) interface which can perform a network communication with a firmware upgrade platform. In some embodiments, the processor 530 may control an overall operation of the network storage 500. For example, the processor 530 may perform the firmware upgrade method of the network storage according to some embodiments.

The memory 510 may be implemented as a volatile memory (such as DRAM, SRAM) or a non-volatile memory (such as PRAM or a flash memory), and may store the firmware for controlling the operation of the network storage. In some embodiments, the processor 530 may include a central processing unit, a microprocessor, and the like. For example, in some embodiments, the processor 530 may be implemented as a multi-core processor (e.g. a dual-core processor or a quad-core processor). The processor 530 may execute the firmware stored in the memory 510 to control the operation of the network storage 500, and may perform the firmware upgrade method of the network storage according to some embodiments.

Specifically, the processor 530 may perform the firmware upgrade method described and illustrated with respect to FIGS. 3-4. The processor 530 may inquire about the latest firmware version for the network storage from the firmware upgrade platform through the wired and/or wireless network (e.g. a wired and/or wireless Ethernet) via the network interface 520. In response to the latest firmware version being inconsistent with a current firmware version of the network storage 100 that is stored in the memory 510, the processor 530 may download the latest version of firmware from the firmware upgrade platform through the wired and/or wireless network via the network interface 520, and perform the firmware upgrade. For example, in some embodiments, the processor 530 may update the firmware currently stored in the memory 510 using the downloaded firmware and activate the downloaded firmware so as to complete the firmware upgrade.

In some embodiments, the processor 530 may determine whether the network storage is in a firmware upgrade state before inquiring about the latest firmware version from the firmware upgrade platform over the wired/wireless network, and in response to the network storage being in a non-firmware upgrade state, perform the inquiring about the latest firmware version from the firmware upgrade platform over the wired and/or wireless network. Here, the firmware upgrade state is used to indicate that the network storage 500 is in a state in which the firmware is being upgraded. In addition, when the network storage 500 is initialized, the processor 530 may set the network storage 500 to the non-firmware upgrade state. As such, when the network storage 500 is in the non-firmware upgrade state, the processor 530 may perform the inquiring about the latest firmware version, and when the network storage 500 is in the firmware upgrade state, the processor 530 may not perform the inquiring about the latest firmware version, but at a beginning of a next cycle, the processor 530 may re-determine whether the network storage 500 is in the firmware upgrade state.

In some embodiments, in response to the latest firmware version being inconsistent with the current firmware version of the network storage 500, the processor 530 may set the network storage 500 to the firmware upgrade state before downloading the latest version of firmware from the firmware upgrade platform. In some embodiments, if the latest firmware version is consistent with the current firmware version of the network storage 500, the processor 530 may re-perform the inquiring of the latest firmware version at the beginning of the next cycle. In some embodiments, after the firmware upgrade is completed, the processor 530 may set the network storage 500 to the non-firmware upgrade state, i.e. making the firmware upgrade state to be not set. After that, the processor 530 may restart performing the firmware upgrade method described above at the beginning of the next cycle.

Figure 6:
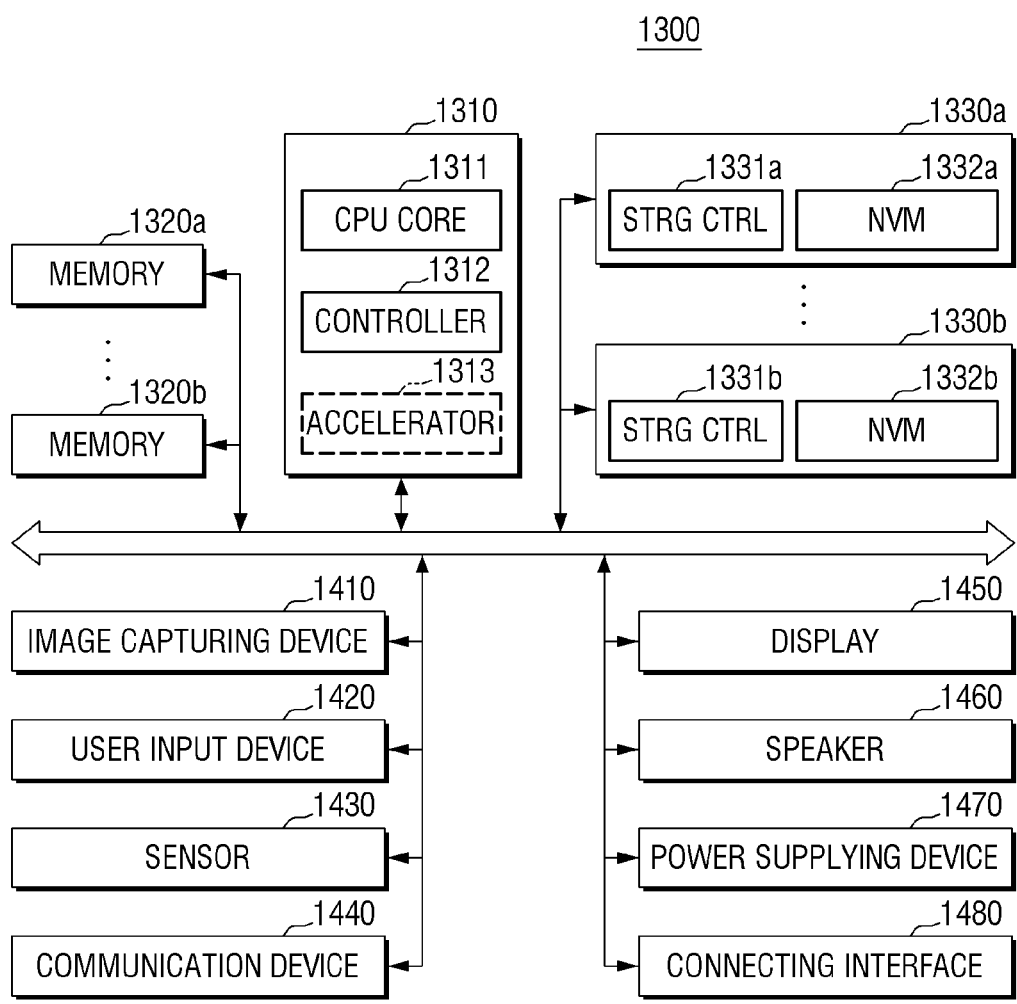
FIG. 6 is a schematic diagram illustrating an electronic system, according to some embodiments.

FIG. 6 is a schematic diagram illustrating an electronic system, according to some embodiments. In some embodiments, the electronic system 1300 may be a mobile system, such as a portable communication terminal (e.g., a mobile phone), a smartphone, a tablet personal computer (PC), a wearable device, a healthcare device, or an Internet of things (JOT) device. However, the electronic system 1300 of FIG. 6 is not necessarily limited to the mobile system and, in some embodiments, may be a PC, a laptop computer, a server, a media player, or an automotive device (e.g., a navigation device).

Referring to FIG. 6, the electronic system 1300 may include a main processor 1310, memories (e.g., 1320a and 1320b), and storage devices (e.g., 1330a and 1330b). In addition, the electronic system 1300 may include at least one of an image capturing device 1410, a user input device 1420, a sensor 1430, a communication device 1440, a display 1450, a speaker 1460, a power supplying device 1470, and a connecting interface 1480.

The main processor 1310 may control all operations of the electronic system 1300, more specifically, operations of other components included in the electronic system 1300. The main processor 1310 may be implemented as a processor, a dedicated processor, or an application processor.

The main processor 1310 may include at least one CPU core 1311 and further include a controller 1312 configured to control the memories 1320a and 1320b and/or the storage devices 1330a and 1330b. In some embodiments, the main processor 1310 may further include an accelerator 1313, which is a dedicated circuit for a high-speed data operation, such as an artificial intelligence (AI) data operation. The accelerator 1313 may include a graphics processing unit (GPU), a neural processing unit (NPU) and/or a data processing unit (DPU) and be implemented as a chip that is physically separate from the other components of the main processor 1310.

The memories 1320a and 1320b may be used as main memory devices of the electronic system 1300. Although each of the memories 1320a and 1320b may include a volatile memory, such as static random access memory (SRAM) and/or dynamic RAM (DRAM), each of the memories 1320a and 1320b may include non-volatile memory, such as a flash memory, phase-change RAM (PRAM) and/or resistive RAM (RRAM). The memories 1320a and 1320b may be implemented in the same package as the main processor 1310.

The storage devices 1330a and 1330b may serve as non-volatile storage devices configured to store data regardless of whether power is supplied thereto, and have larger storage capacity than the memories 1320a and 1320b. The storage devices 1330a and 1330b may respectively include storage controllers (STRG CTRL) 1331a and 1331b and NVMs (Non-Volatile Memory) 1332a and 1332b configured to store data via the control of the storage controllers 1331a and 1331b. Although the NVMs 1332a and 1332b may include flash memories having a two-dimensional (2D) structure or a three-dimensional (3D) V-NAND structure, the NVMs 1332a and 1332b may include other types of NVMs, such as PRAM and/or RRAM.

The storage devices 1330a and 1330b may be physically separated from the main processor 1310 and included in the electronic system 1300, or implemented in the same package as the main processor 1310. In addition, the storage devices 1330a and 1330b may have types of solid-state devices (SSDs) or memory cards and be removably combined with other components of the electronic system 1300 through an interface, such as the connecting interface 1480 that will be described below. The storage devices 1330a and 1330b may be devices to which a standard protocol, such as a universal flash storage (UFS), an embedded multi-media card (eMMC), or a non-volatile memory express (NVMe), is applied, without being limited thereto. At least one of storage devices 1330a and 1330b can be a network storage such as the network storage 100 or the network storage 500 described above, and can be configured to perform the firmware upgrade method described with reference to FIG. 3.

The image capturing device 1410 may capture still images or moving images. The image capturing device 1410 may include a camera, a camcorder, and/or a webcam.

The user input device 1420 may receive various types of data input by a user of the electronic system 1300 and include a touch pad, a keypad, a keyboard, a mouse, and/or a microphone.

The sensor 1430 may detect various types of physical quantities, which may be obtained from the outside of the electronic system 1300, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the electronic system 1300 according to various communication protocols. The communication device 1440 may include an antenna, a transceiver, and/or a modem.

The display 1450 and the speaker 1460 may serve as output devices configured to respectively output visual information and auditory information to the user of the electronic system 1300.

The power supplying device 1470 may appropriately convert power supplied from a battery (not shown) embedded in the electronic system 1300 and/or an external power source, and supply the converted power to each of components of the electronic system 1300.

The connecting interface 1480 may provide connection between the electronic system 1300 and an external device, which is connected to the electronic system 1300 and capable of transmitting and receiving data to and from the electronic system 1300. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 7:
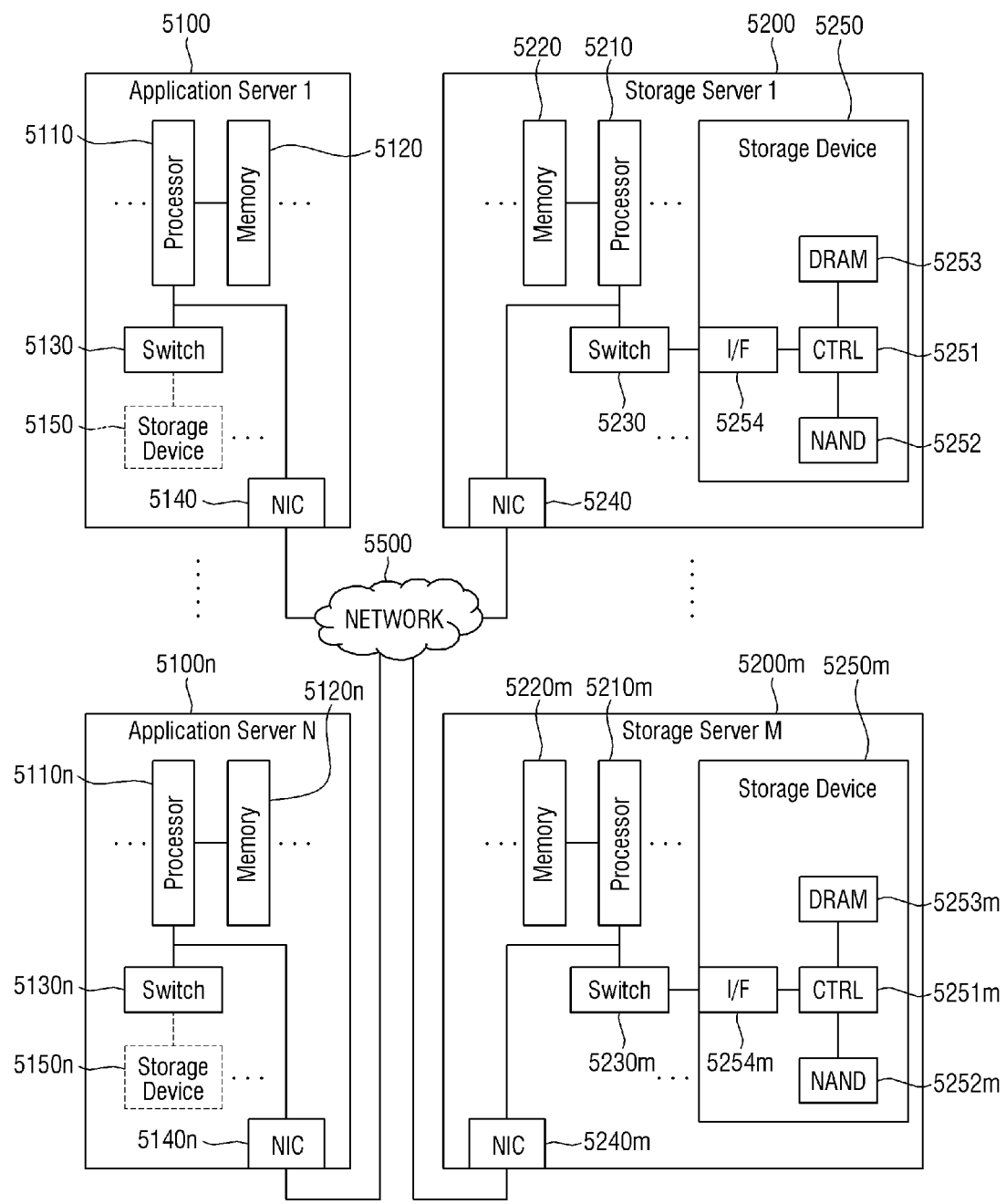
FIG. 7 is a schematic diagram illustrating a data center, according to some embodiments.

FIG. 7 a schematic diagram illustrating a data center, according to some embodiments.

Referring to FIG. 7, the data center 5000 may be a facility that collects various types of pieces of data and provides services and be referred to as a data storage center. The data center 5000 may be a system for operating a search engine and a database, and may be a computing system used by companies, such as banks, or government agencies. The data center 5000 may include application servers 5100 to 5100n and storage servers 5200 to 5200m. The number of application servers 5100 to 5100n and the number of storage servers 5200 to 5200m may be variously selected according to embodiments. The number of application servers 5100 to 5100*n* may be different from the number of storage servers 5200 to 5200*m*. The storage servers 5200 to 5200*m* can include a network storage such as the network storage 100 or the network storage 500 described above, and can be configured to perform the firmware upgrade method described with reference to FIG. 3.

The application server 5100 or the storage server 5200 may include at least one of processors 5110 and 5210 and memories 5120 and 5220. The storage server 5200 will now be described as an example. The processor 5210 may control all operations of the storage server 5200, access the memory 5220, and execute instructions and/or data loaded in the memory 5220. The memory 5220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 5210 and memories 5220 included in the storage server 5200 may be variously selected. In an embodiment, the processor 5210 and the memory 5220 may provide a processor-memory pair. In an embodiment, the number of processors 5210 may be different from the number of memories 5220. The processor 5210 may include a single-core processor or a multi-core processor. The above description of the storage server 5200 may be similarly applied to the application server 5100. In some embodiments, the application server 5100 may not include a storage device 5150. The storage server 5200 may include at least one storage device 5250. The number of storage devices 5250 included in the storage server 5200 may be variously selected according to embodiments.

The application servers 5100 to 5100*n* may communicate with the storage servers 5200 to 5200*m* through a network 5300. The network 5300 may be implemented by using a fiber channel (FC) or Ethernet. In this case, the FC may be a medium used for relatively high-speed data transmission and use an optical switch with high performance and high availability. The storage servers 5200 to 5200*m* may be provided as file storages, block storages, or object storages according to an access method of the network 5300.

In an embodiment, the network 5300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 5300 may be a network, such as a TCP/IP network. For example, the network 5300 may be implemented according to a protocol, such as FC over Ethernet (FCoE), network attached storage (NAS), and NVMe over Fabrics (NVMe-oF).

Hereinafter, the application server 5100 and the storage server 5200 will mainly be described. A description of the application server 5100 may be applied to another application server 5100*n*, and a description of the storage server 5200 may be applied to another storage server 5200*m*.

The application server 5100 may store data, which is requested by a user or a client to be stored, in one of the storage servers 5200 to 5200*m* through the network 5300. Also, the application server 5100 may obtain data, which is requested by the user or the client to be read, from one of the storage servers 5200 to 5200*m* through the network 5300. For example, the application server 5100 may be implemented as a web server or a database management system (DBMS).

The application server 5100 may access a memory 5120*n* or a storage device 5150*n*, which is included in another application server 5100*n*, through the network 5300. In some embodiments, the application server 5100 may access memories 5220 to 5220*m* or storage devices 5250 to 5250*m*, which are included in the storage servers 5200 to 5200*m*, through the network 5300. Thus, the application server 5100 may perform various operations on data stored in application servers 5100 to 5100*n* and/or the storage servers 5200 to 5200*m*. For example, the application server 5100 may execute an instruction for moving or copying data between the application servers 5100 to 5100*n* and/or the storage servers 5200 to 5200*m*. In this case, the data may be moved from the storage devices 5250 to 5250*m* of the storage servers 5200 to 5200*m* to the memories 5120 to 5120*n* of the application servers 5100 to 5100*n* directly or through the memories 5220 to 5220*m* of the storage servers 5200 to 5200*m*. The data moved through the network 5300 may be data encrypted for security or privacy.

A firmware upgrade method of a network storage and a network storage according to some embodiments can periodically check a firmware version and automatically download the latest version of firmware, which solves a problem that the network storage cannot obtain the latest version of firmware promptly when a new firmware version is available. In addition, the firmware upgrade method of the network storage and the network storage according to some embodiments can realize automatic upgrade of the firmware of the network storage, avoid a problem of low upgrade efficiency caused by manually upgrading a plurality of network storages one by one, save firmware upgrade time, and reduce a problem of lack of security and a problem of decreased operational efficiency caused by not upgrading the firmware promptly when a new version of the firmware is available.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. The scope of the disclosure is defined not by the detailed description but by the appended claims, and all differences within the scope should be understood as being included in the disclosure.

Thus, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A firmware upgrade method comprising:
inquiring, by a network storage, about a latest firmware version for the network storage from a firmware upgrade platform through a network via a network interface of the network storage; and based on the latest firmware version being inconsistent with a current firmware version of the network storage, downloading, by the network storage, the latest firmware version from the firmware upgrade platform through the network via the network interface and performing a firmware upgrade based on the latest firmware version.

2. The firmware upgrade method of claim 1, wherein the network is a wired network and/or a wireless network.

3. The firmware upgrade method of claim 1, further comprising:
before the downloading, setting, by the network storage, the network storage to a firmware upgrade state.

4. The firmware upgrade method of claim 3, further comprising:
after performing the firmware upgrade, setting, by the network storage, the network storage to a non-firmware upgrade state.

5. The firmware upgrade method of claim 1, further comprising:
determining, by the network storage, whether the network storage is in a firmware upgrade state;
based on the network storage being in a non-firmware upgrade state, performing the inquiring.

6. The firmware upgrade method of claim 1, wherein the network storage is an Ethernet solid state drive.

7. The firmware upgrade method of claim 1, wherein the network storage automatically performs the inquiring and automatically performs the downloading.

8. The firmware upgrade method of claim 1, wherein the network storage periodically performs the inquiring about the latest firmware version from the firmware upgrade platform.

9. A network storage comprising:
a memory configured to store memory firmware;
a network interface configured to access a network; and
a processor configured to:
inquire about a latest firmware version for the network storage from a firmware upgrade platform through the network via the network interface, and
based on the latest firmware version being inconsistent with a current firmware version of the network storage, download the latest firmware version from the firmware upgrade platform through the network via the network interface, and perform a firmware upgrade based on the latest firmware version.

10. The network storage of claim 9, wherein the network is a wired network and/or a wireless network.

11. The network storage of claim 9, wherein the processor is further configured to:
before downloading the latest firmware version, set the network storage to a firmware upgrade state.

12. The network storage of claim 11, wherein the processor is further configured to:
after performing the firmware upgrade, set the network storage to a non-firmware upgrade state.

13. The network storage of claim 9, wherein the processor is further configured to:
determine whether the network storage is in a firmware upgrade state;
based on the network storage being in a non-firmware upgrade state, perform the inquiring.

14. The network storage of claim 9, wherein the network storage is an Ethernet solid state drive.

15. The network storage of claim 9, wherein the processor is configured to automatically inquire about the latest firmware version and, based on the latest firmware version being inconsistent, automatically download the latest firmware version.

16. The network storage of claim 9, wherein the processor is configured to periodically inquire about the latest firmware version from the firmware upgrade platform.

17. A firmware upgrade method comprising:
automatically checking, by a network storage, a latest firmware version for the network storage from a firmware upgrade platform through a network via a network interface of the network storage;
comparing, by the network storage, the latest firmware version with a current firmware version of the network storage; and
based on the latest firmware version not being a same firmware version as the current firmware version, automatically downloading, by the network storage, the latest firmware version from the firmware upgrade platform through the network via the network interface and updating the current firmware version based on the latest firmware version.

18. The firmware upgrade method of claim 17, wherein the network storage is an Ethernet solid state device and the network is a wired or a wireless Ethernet network.

* * * * *